United States Patent [19]
Liu et al.

[11] Patent Number: 5,577,221
[45] Date of Patent: Nov. 19, 1996

[54] METHOD AND DEVICE FOR EXPANDING ROM CAPACITY

[75] Inventors: Chih-Yuan Liu, Chupei; Po-Chuan Kang, Pan-Chiao, both of Taiwan

[73] Assignee: Industrial Technology Research Institute, Hsinchu, Taiwan

[21] Appl. No.: 227,721

[22] Filed: Apr. 14, 1994

[51] Int. Cl.$^6$ .................................................. G06F 12/00
[52] U.S. Cl. ...................... 395/427; 395/402; 395/412; 395/416; 395/419; 395/429
[58] Field of Search ...................... 395/800, 425, 395/400, 430; 365/230.01, 189.03; 364/DIG. 1

[56] References Cited

U.S. PATENT DOCUMENTS

| | | | |
|---|---|---|---|
| 3,972,025 | 7/1976 | Taddei | 340/172.5 |
| 4,158,227 | 6/1979 | Baxter et al. | 364/DIG. 1 |
| 4,691,319 | 9/1987 | Phillips | 371/20 |
| 4,831,522 | 5/1989 | Henderson et al. | 364/DIG. 1 |
| 4,926,322 | 5/1990 | Stimac et al. | 364/DIG. 1 |
| 5,027,273 | 6/1991 | Letwin | 364/DIG. 1 |
| 5,146,580 | 9/1992 | Naidu et al. | 395/425 |
| 5,155,826 | 10/1992 | Fadem | 395/425 |
| 5,237,669 | 8/1993 | Spear et al. | 395/400 |
| 5,371,876 | 12/1994 | Ewertz et al. | 395/425 |
| 5,479,639 | 12/1995 | Ewettz et al. | 395/430 |

*Primary Examiner*—Alyssa H. Bowler
*Assistant Examiner*—Walter D. Davis
*Attorney, Agent, or Firm*—W. Wayne Liauh

[57] ABSTRACT

An expandable ROM module adapted for use with an existing ROM interface having a predetermined number of address lines to provide an expanded memory array of variable size. The expanded memory is divided into a plurality (T) of pages and a temporary storage device is provided to store page address data. The temporary storage device includes a T-bit page selection register, which receives address input from the ROM interface, and a mapping array, which has T entries, to direct address inputs to each page. Page address data are stored in the temporary storage device via a convert-read-to-write method, which utilizes read interface and read cycle to perform write operations. Several convert-read-to-write methods can be provided depending on the number of addresses that need to be reserved and the complexity of circuitry and programming that will be involved. Examples of the convert-read-to-write methods include: direct, direct but segmented, indirect and segmented, multiple-indirect and segmented. The indirect methods involve at least one index register, which is another temporary storage device.

18 Claims, 13 Drawing Sheets

METHOD AND DEVICE FOR EXPANDING ROM CAPACITY

FIELD OF THE INVENTION

This invention relates to a read-only-memory (ROM) having expandable memory capacity. More specifically, this invention relates to a device and method to provide ROM memories of expanded capacity for an existing system without the need to change ROM interface.

BACKGROUND OF THE INVENTION

Read-only-memory (ROM) is a type of semiconductor memory chip that permanently stores instructions and/or data. Contrary to a read/write memory (RWM), in which data stored can be easily altered and will be lost on power shutdown, ROM is non-volatile and includes no mechanism for altering data after it is initially stored in the memory cell array. Read-only-memories have been extensively used to store control routines in personal computers (ROM BIOS), in peripheral controllers, and in plug-in cartridges such as printers, video games, etc.

When a read-only-memory is designed, the configuration of the memory cell array and the structure of the interface circuitry are designed to be compatible. Generally, a memory cell array of a given size requires a given number of address inputs which must be decoded in a predetermined manner. And if the size of the cell array is altered, the interface circuitry must be correspondingly altered. For example, a ROM having $2^N$ addresses may require an interface circuitry that provides N address lines. If the memory capacity of the ROM is increased to $2^M$ (M>N), then a new interface circuitry providing M address lines will be required. Generally, this requirement renders the existing system unusable and a new system or a new motherboard will be required.

In order to save initial investment, it is highly desirable to provide expanded ROM memory space in existing computers (including video games, etc.). One of the most commonly used method to utilize expanded ROM capacity without substantially increasing the number of address inputs is to organize the memory array into sub-arrays, which are commonly referred to as "pages", and address them accordingly. For example, in a particular system, a ROM with 4K storage unit may require ten address inputs. Expanding the ROM capacity for the same system to 16K would then require twice ($\log_2 4$) as many address inputs, totalling 20. However, if the 16K array is organized into four separate pages, each being an individually addressable 4K array, then only two additional address inputs would be required to select the proper page. Therefore, only twelve address inputs, instead of the twenty inputs in a non-paged configuration, will be required for the expanded ROM.

Examples of the paged ROMs include page-addressed ROMs, such as Model 27513 developed by Intel Corp. The page-addressed ROMs are plug-compatible with non-paged ROMs and allow the expansion of addressable space to four times that amount. These devices, however, require that two or three of the binary data bus lines that previously delivered data only out from the ROM (read-only) be made bidirectional (i.e., read and write) in order to receive page select data. Since few computers have been constructed to provide write signals in ROM program memory, these devices have not been widely usable.

Other techniques have also been disclosed in the prior art to expand the addressable space in ROMs. U.S. Pat. No. 4,831,522 discloses a circuit and method for replacing an existing computer ROM having N binary address lines for addressing $2^N$ addresses and receiving N system address lines with an expanded ROM having Y binary address lines (Y>N) for storing information in $2^Y$ addresses. The device disclosed in the '522 patent requires an address signal generator to generate additional binary address lines and a default page selector means for toggling the additional binary address lines between a current selected page and a default page, the default page selector means being adapted to receive the most significant of the N system address lines. This device has only very limited applications, and is applicable largely in situations in which the desired expanded ROM array is available in a like size package and with acceptable access times.

U.S. Pat. Nos. 4,744,053 and 5,231,603 disclose a variable page ROM to provide memories of increased capacity for pre-existing systems having different fixed numbers of address inputs. An appropriate page configuration is selected to accommodate the number of address inputs in the system, which is adapted to generate a page address signal having the required number of bits on the data bus. The selected page configuration is then obtained by mask programming the address decoder and input buffer circuits, and the page address signal from the data bus is routed through the data transfer buffers and stored in a RAM for use in conjunction with the row and column address inputs. The variable page ROMs disclosed in the '053 and '603 patents require that the ROM interface be capable of receiving and implementing a write-enable control signal. This is generally not available in most computers. Thus the variable page ROM devices of '053 and '603 would require substantial hardware modifications and may not be usable in most applications. Furthermore, since the correspondces between the various pages and the ROM interface are fixed, the variable page ROM devices provide only limited numbers paging configurations.

U.S. Pat. No. 4,979,148 discloses a device for increasing options in mapping ROM in computer memory space. In according to the '148 patent, the ROM code is stored in a feature card in two different versions, or two fields. An adder is provided in the address decoder with an input from the multi-bit register, which is provided in the feature card to store a numerical quantity indicating the particular segment of the read only memory space in which the ROM code of the feature card is to be mapped. The adder output is coupled to the address decoder and to addressing circuitry for the memory device storing the ROM code. The adder is arranged so as to produce an output which is the sum of unity plus the contents of the register, and the address decoder is modified so that it also responds to the output of the adder, in addition to responding to the register. Finally, the Least Significant Bit of the register to select between the two different fields in the memory device on the feature card. The device disclosed in the '148 patent does not allow the ROM capacity to be expanded.

U.S. Pat. No. 5,226,136 discloses a memory cartridge bank selecting apparatus containing a large-capacity, one-chip ROM. Storage area of the ROM is divided into a plurality of banks having respective memory addresses and one specific bank among them is allocated to an address space accessible all the time by the central processing unit. Bank selecting data for selecting other banks is stored in that specific bank. The bank selecting data is read out with execution of a program stored in the specific bank, being loaded in a counter. The content of the counter is inputted to the most significant three bits of address of the one-chip ROM. The most significant three bits of the address function as bank designating bits. An arbitrary bank of the one-chip ROM is changed over at an arbitrary timing by the bank selecting data outputted from the other banks of the one-chip ROM. Similar to many of the prior devices discussed above, the apparatus disclosed in the '136 patent requires read/write signals to select the appropriate page. Furthermore, the '136 patent requires a counter to execute the paging program stored in the specific bank.

SUMMARY OF THE INVENTION

Having discussed the desirability to provide ROMs of expandable capacity and the shortcomings of methods and/or devices disclosed in the prior art, the primary object of the present invention is, therefore, to provide a device and method which will allow the capacity of ROM memories to be expanded for an existing system without the need to change ROM interface, thus saving the initial investment and conserving material. The present invention is particularly advantageous for ROMs that do not accept write signals at the ROM interface.

The present invention discloses an expandable ROM module (hereinafter abbreviated as ExRM), which allows the capacity of a ROM to be expanded within a given addressing space. The ExRM disclosed in the present invention allows a scalable page configuration to be provided in the ROM, and utilizes a convert-read-to-write technique to select an appropriate page configuration. The convert-read-to-write technique utilizes read interface and read cycle to perform write operations, thus it can be easily adapted to an existing system. The ExRM of the present invention can consist of a plurality of ROMs of same or varying capacities. Or it can be fabricated in a single chip to form a ROM IC. The scalability of the page configuration allows the ExRM of the present invention to be extremely flexible. Furthermore, because its capacity can be expanded in a fixed addressing space, the ExRM of the present invention can work with the existing ROM interface, and no hardware modification is required.

The basic architecture of the present invention can be summarized below. An ExRM disclosed in the present invention is provided to work with an existing interface circuitry having an I-bit address bus and a D-bit data bus. The ExRM consists of n ROM chips ROM chip 0 through ROM chip (n−1), i.e., ROM chip 0, ROM chip 1, ... ROM chip (n−1). The ROM chips have memory capacities of $2^{R0}$, $2^{R1}$, ... and $2^{R(n-1)}$, respectively. Thus the total capacity of the ExRM is:

$$V = \sum_{i=0}^{n-1} 2^{Ri} \quad (1)$$

The capacity of the ExRM can be expanded by either increasing the number of the ROM chips constituting the ROM module, or increasing the capacity of one or more individual ROM chips, or both.

One of the key elements of the ExRM of the present invention is a selection circuit, which properly decode the address ($A_i$) and chip selector ($CS_i$) to allow the system to read selected data stored in the various ROM chips or pages through the interface circuit. The selection circuit of the present invention defines a scalable mapping configuration, in which the page size is preferably defined as:

$$P = \min(I, R_0, R_1, \ldots, R_{n-1}) \quad (2)$$

From the above defined page size, the number of pages in the ROM interface (i.e., the system pages) can be calculated below:

$$S = 2^I / 2^P = 2^{(I-P)} \quad (3)$$

Likely, the number of pages of each individual ROM chip (i.e., the ExRM pages) can be calculated below:

$$Q_i 2^{Ri}/2^P = 2^{(Ri-P)}, \quad (0 \leq i \leq n-1) \quad (4)$$

Accordingly, the total number of pages in the ExRM, T, equals:

$$\sum_{i=0}^{n-1} Q_i = \sum_{i=0}^{n-1} 2^{(Ri-P)} \quad (5)$$

In the present invention, each ExRM page is provided with a page selector (PS), which contains 1-bit storage element. And the ExRM is provided with a T-bit page selector register (PSR), each bit corresponding to a page selector of an ExRM page. To properly determine the correspondence between the ExRM page and the system page, every ExRM page is also provided with a Mapping Array (MA), which contains an (I−P)-bit storage element. From the PSR, there are X page configurations, wherein:

$$X = C(T, I-P) = (T!)/\{[T-(I-P)]!(I-P)!\} \quad (6)$$

And from corresponding MA, each element provides Y page possible configurations (or order number), wherein:

$$Y = P(I-P, 1) = (I-P)! \quad (7)$$

Therefore, the total number of page configurations that can be provided by the ExRM of the present invention can be calculated below:

Total Number of Possible Page Configurations=X×Y=C(T, I−P)× P(I−P, 1)  (8)

Because most conventional ROMs contain data bus lines that only deliver data out from the ROM and they do not have provisions to receive write enable line of the system control bus, the present invention utilizes a convert-read-to-write technique to write appropriate page configuration data into the PSR and MA. With the convert-read-to-write technique, certain fixed address spacing needs to be reserved in the address bus line to allow page configuration data to be contained in the address input. When these addresses are read, the page configuration address data will be written to the corresponding storage elements. Various convert-read-to-write techniques can be implemented in accordance to the complexity of the page configuration and the number of the reserved addresses. Some examples of the convert-read-to-write techniques will be discussed below. The convert-read-to-write techniques allow the ExRMs of the present invention to assume a scalable page configuration with an existing system without hardware modifications.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

Figure 1:
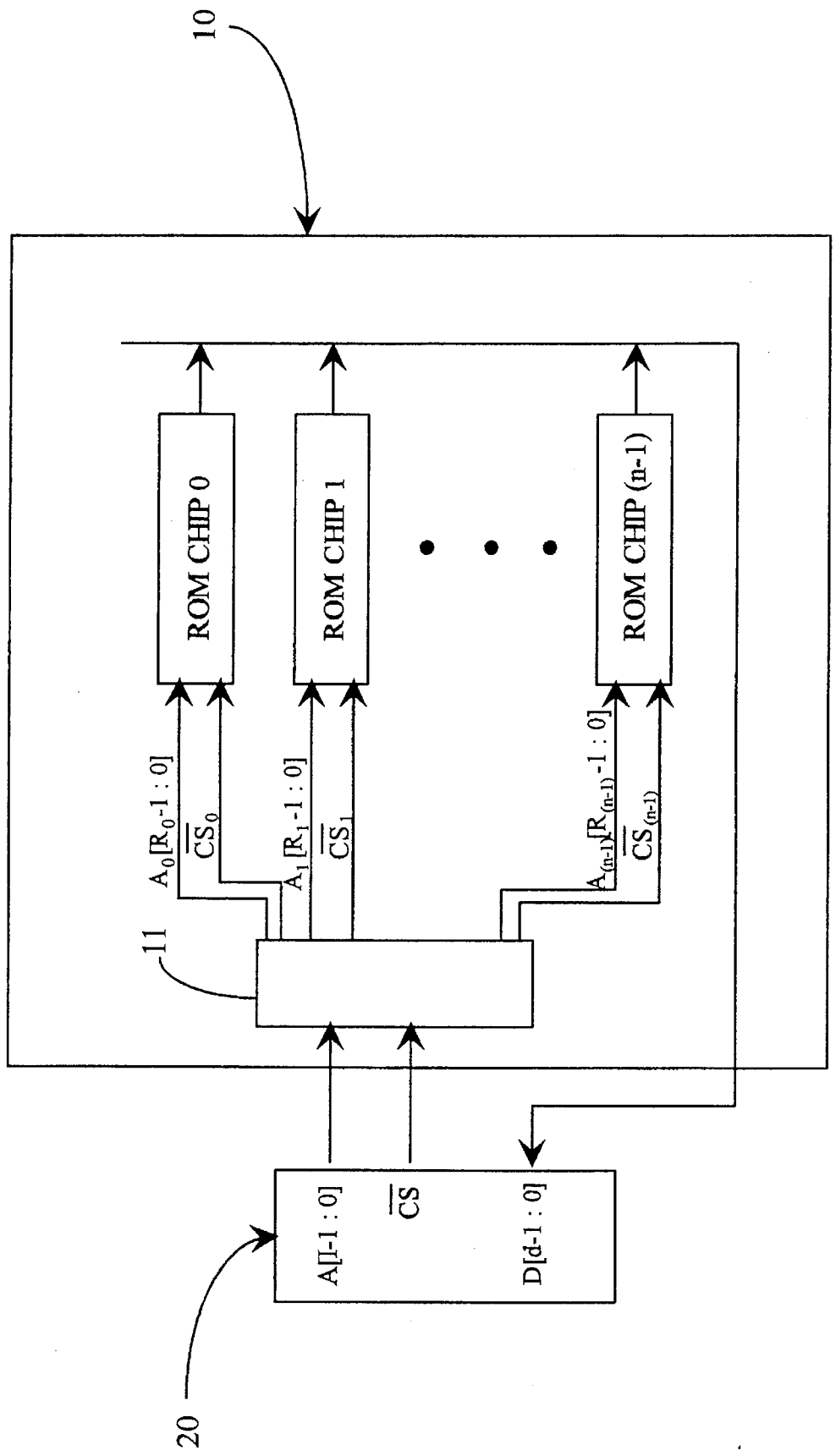
FIG. 1 is a schematic diagram of the expandable ROM module (ExRM) of the present invention.

FIG. 1 is a schematic diagram of the expandable ROM module (ExRM) 10 of the present invention comprising ROM chips $R_0$ through $R_{(n-1)}$. At the ROM interface 20, the address bus contains I address lines, $A[I-1:0]$. The ROMs return output in a d-bit data bus, $D[d-1:0]$. Output buffers are controlled by the chip select input, CS. In FIG. 1, the ExRM has n ROM chips, having memory capacities of $2^{R0}$, $2^{R1}$, ..., and $2^{R(n-1)}$, respectively. The ExRM as shown in FIG. has an expandable capacity V of:

$$V = \sum_{i=0}^{n-1} 2^{Ri} \qquad (1)$$

The selection circuit 11 determines the selection of the individual ROM chip to send the address ($A_0[R_0-1:0]$ through $A_{(n-1)}[R_{(n-1)}-1:0]$) and control signals ($CS_0$ through $CS_{(n-1)}$).

Figure 2:
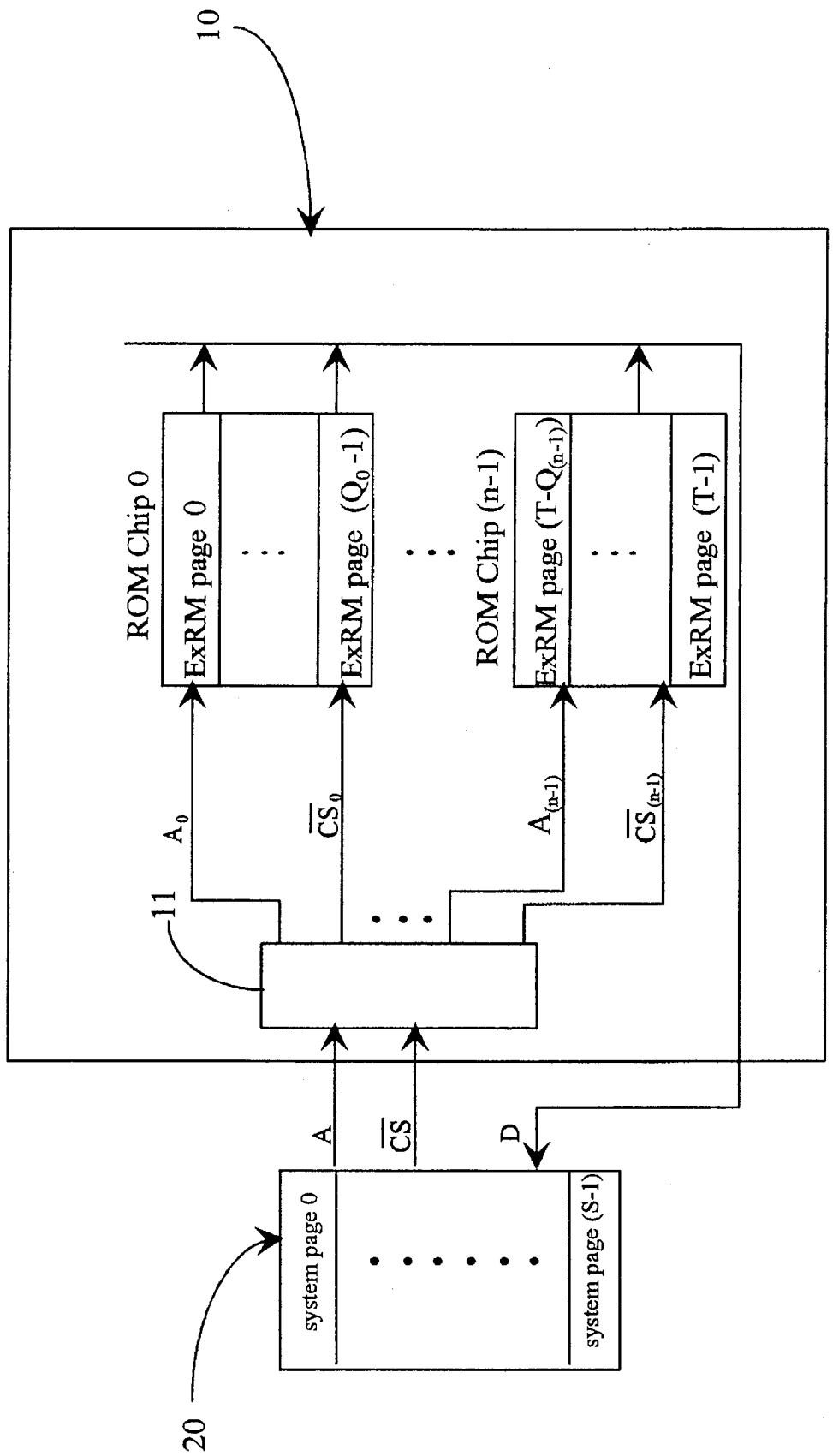
FIG. 2 is a schematic diagram of the expandable ROM module (ExRM) of the present invention, expressed in terms of pages.

FIG. 2 is a schematic diagram of the expandable ROM module (ExRM) of the present invention as shown in FIG. 1, expressed in terms of pages. A page is selected which has a page size of $2^P$, wherein:

$$P = \min(I, R_0, R_1, \ldots, R_{(n-1)}) \qquad (9)$$

As discussed earlier, the number of system pages at the ROM interface is:

$$S = 2^I/2^P = 2^{(I-P)} \qquad (3)$$

In FIG. 2, the first ROM chip, ROM chip 0, has pages from ExRM page0 through ExRM page($Q_0-1$), the second ROM chip, ROM chip 1, has pages from ExRM page($Q_0$) through ExRM page($Q_0+Q_1-1$), etc. The last ROM chip, ROM chip (n−1), has pages from ExRM page($T-Q_{(n-1)}$) through ExRM page($T-1$). The page configuration is determined by the selection circuit, which will be discussed below.

Figure 3:
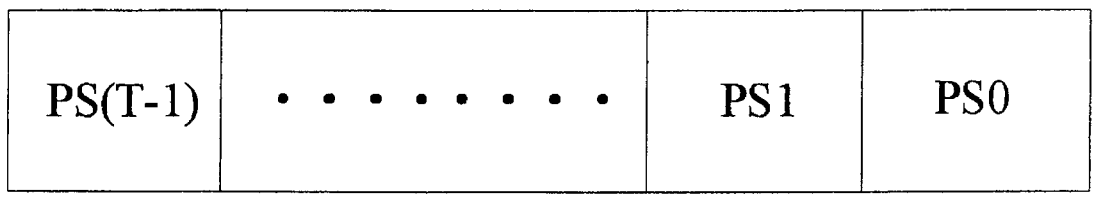
FIG. 3 is a schematic representation of a T-bit page selection register (PSR), wherein T is the number of total pages.
Figure 4:
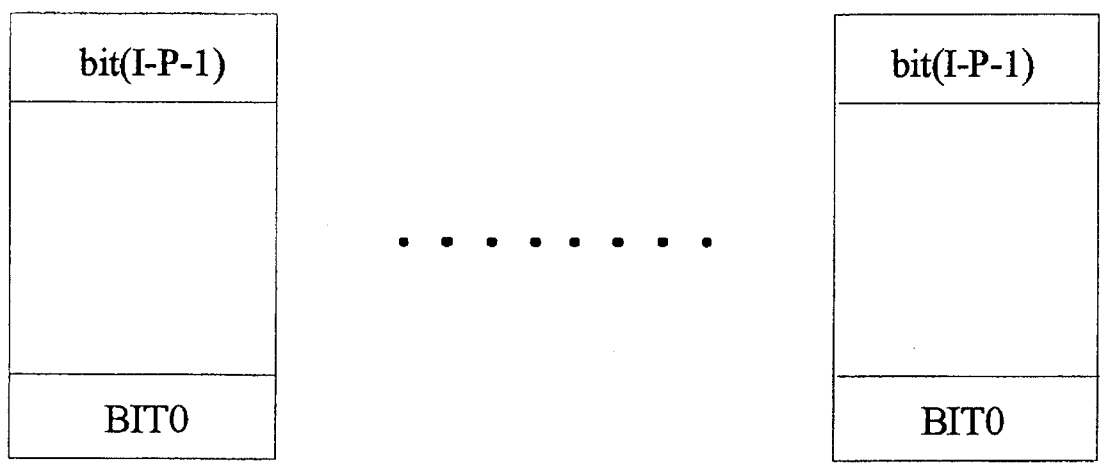
FIG. 4 is a schematic representation of a (I−P)-bit mapping array (MA), wherein I is the number of address lines in the address bus and P is the 2-based logarithm of the page size.

To discuss the selection circuit, we must first discuss the page selection register (PSR) and mapping array (MA). Both PSR and MA are temporary storage devices for storing page adresses and can be provided in the form of a latch, flip-flop, or a cross-coupled pair of logic gates. FIG. 3 is a schematic representation of a T-bit page selection register (PSR), wherein T is the number of total pages. The bit addresses of the page selection register are designated as PS0 through PS(T−1). FIG. 4 is a schematic representation of a (I−P)-bit mapping array (MA), wherein I is the number of address lines in the address bus and P is the 2-based logarithm of the page size. Since each page is provided with a mapping array, there will be T mapping arrays, MA[0] through MA[T−1].

Figure 5:
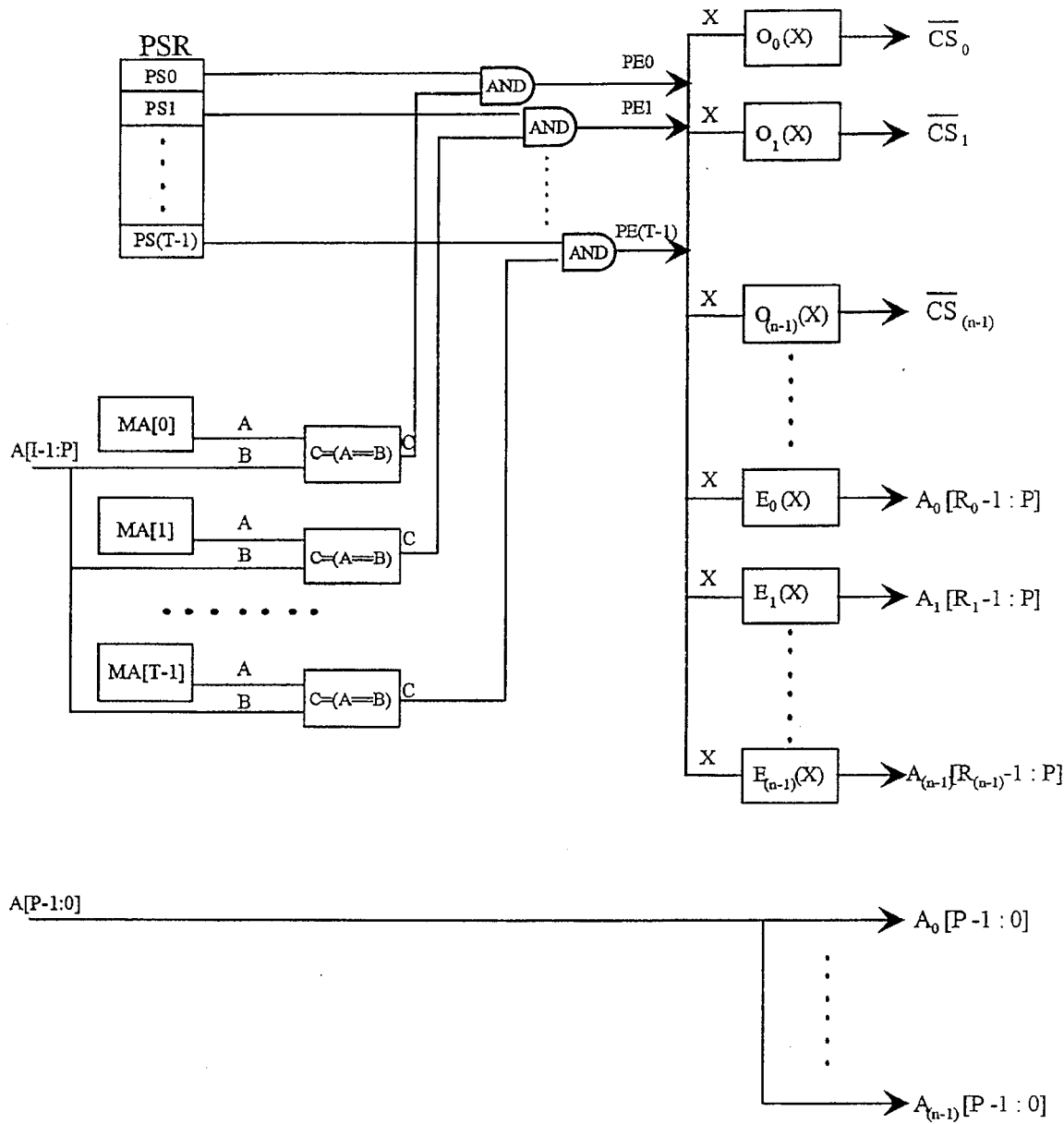
FIG. 5 is a schematic diagram of a selection circuit provided in the ExRM.

FIG. 5 shows how the page selection register and the mapping array are utilized in providing the page configuration. As shown in FIGS. 3 and 4, the page selection register has T bits designated as $PS_i$, i.e., PS0 through PS(T−1). Since there are T pages, T mapping arrays are provided, MA[0] through MA[T−1], one mapping array for each page. Each of the mapping arrays has the same (I−P) bits. In FIG. 5, $PE_i$, which is the page enable signal for page i of the ExRM, is obtained as:

$$PE_i = PS_i \text{ AND } (MA[i] = A[I-1:P]) \qquad (10)$$

$O_i(x)$ and $E_i(x)$ are obtained, respectively, as follows:

$$O_i(x) = NOR(PE_j, PE_{(j+1)}, \ldots, PE_{(j+Q_i-1)}) \qquad (11)$$

$$\begin{aligned}
E_i(x) &= \log_2(Q_i)\text{-bit binary encoder} & (12) \\
&\quad (PE_j, PE_{(j+1)}, \ldots, PE_{(j+Q_i-1)}) \\
&= (R_i - P)\text{-bit binary encoder} & (13) \\
&\quad (PE_j, PE_{(j+1)}, \ldots, PE_{(j+Q_i-1)})
\end{aligned}$$

In Eqns (7) and (8), the subscript j is defined as:

$$j = \sum_{L=1}^{i-1} Q_L \qquad (14)$$

and the m-bit binary encoder E(x) is defined as:
For k=0 to $2^m-1$, $$\text{If } x[k] = 1 \to E(x) = k \qquad (15)$$

In practice, the contents of PSR and MA are entered and refreshed via a convert-read-to-write technique. To establish the appropriate page configuration, first, S (the number of system pages) bits of the T-bit (T being the total number of pages) PSR are set as "1" in accordance with whichever ExRM pages are to be selected to correspond to the system page. Then a selected order number (ON=0~S−1), by which the selected ExRM pages on corresponded to the system page, is written to the mapping array for each selected ExRM page. The following example illustrates how the page configurations can be made.

In an ExRM with the following parameters:
I=5; n=2; $R_0$=6; $R_1$=4
we can calculate that:
P=min (5, 6, 4)=4
S=$2^5/2^4$=2
$Q_0=2^6/2^4=2^2=4$
$Q_1=2^4/2^4=2^0=1$
T=$Q_0+Q_1$=4+1=5

Figure 6A:
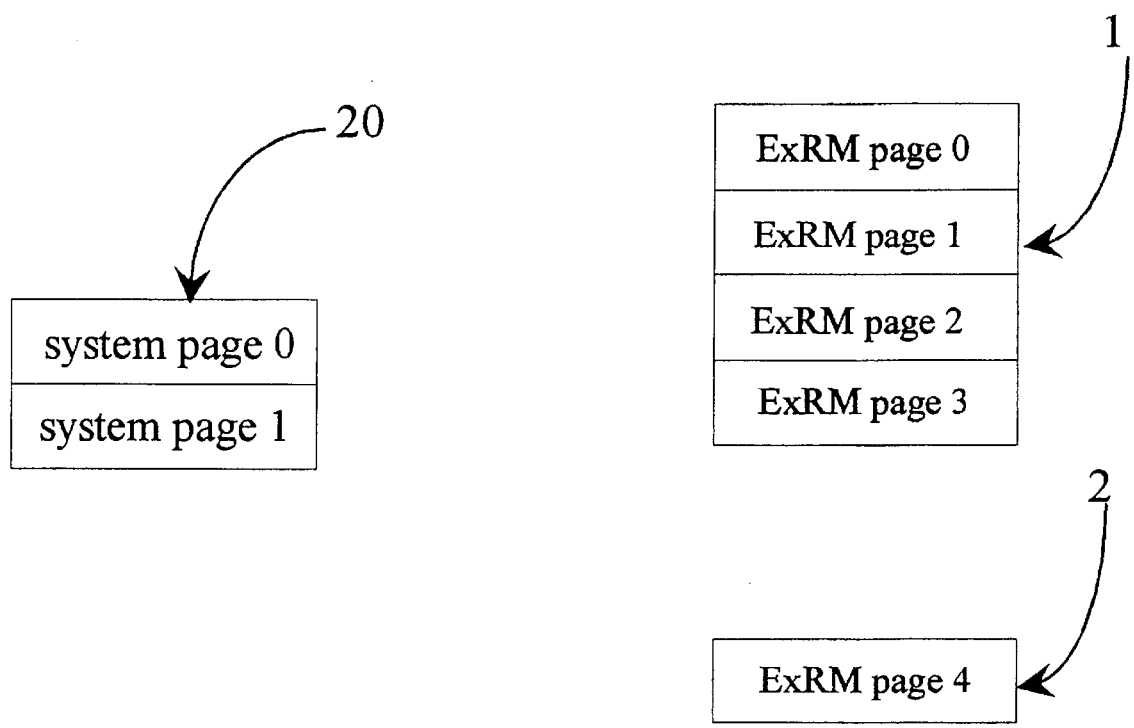
FIG. 6A shows a schmatic diagram of the page configuration between system pages and ExRM pages.

FIG. 6A shows all the system page and ExRM page configurations. There are 2 system pages at the ROM interface, system page 0 and system page 1. ROM chip 1 has 4 ExRM pages, ExRM page 0 through ExRM page 3, and ROM chip 2 has 1 ExRM page, ExRM page 4. Since there are a total of 5 pages, the PSR will be a 5-bit register, represented below:

| PS4 | PS3 | PS2 | PS1 | PS1 |
|---|---|---|---|---|

There will also be 5 entries for the mapping array, each being (I–P)-bit, or 2-bit:

| MA[4] | MA[3 | MA[2] | MA[1] | MA[0] |
|---|---|---|---|---|

Since there are C(5, 2) ways to write into the PSR, there are (5×4)/(2×1)=10 possible system page configurations. Further, since each entry in the selected MA can have P(2, 1) order number, the total number of possible correspondences between the system pages and ExRM pages is 20, i.e., Total number of possible correspondences between the system pages and the T pages=C(5, 2)×P(2, 2)=20

Figure 6B:
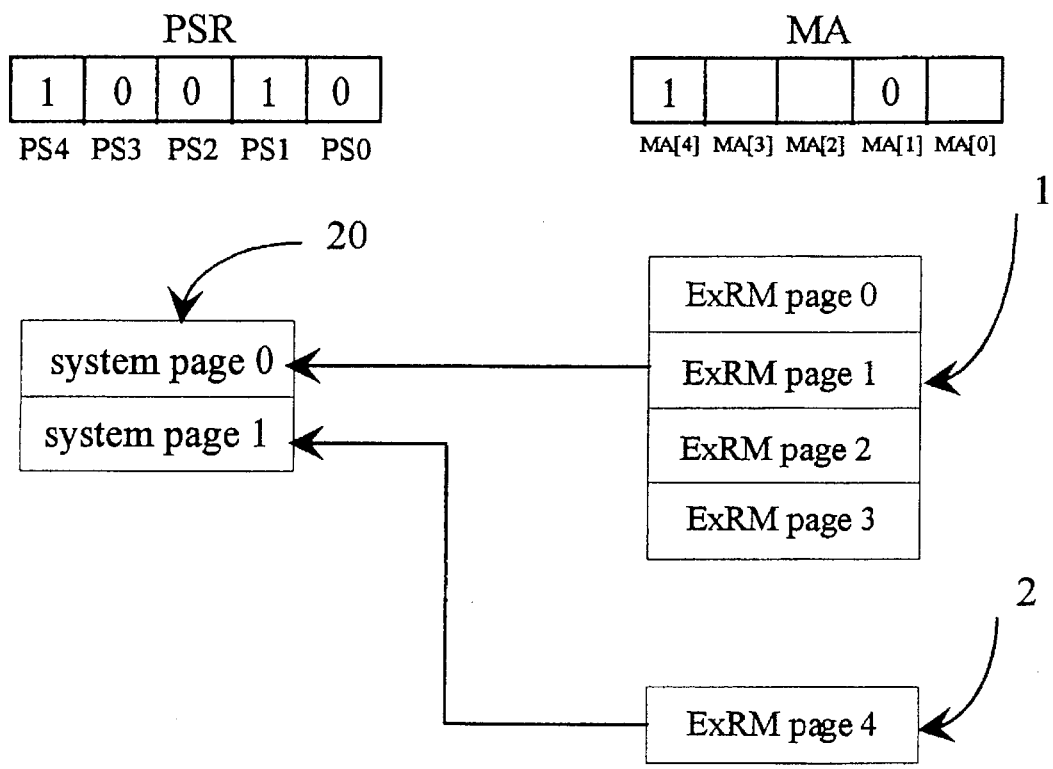
FIGS. 6B and 6C show two examples of the page configuration between the system pages and the ExRM pages.
Figure 6C:
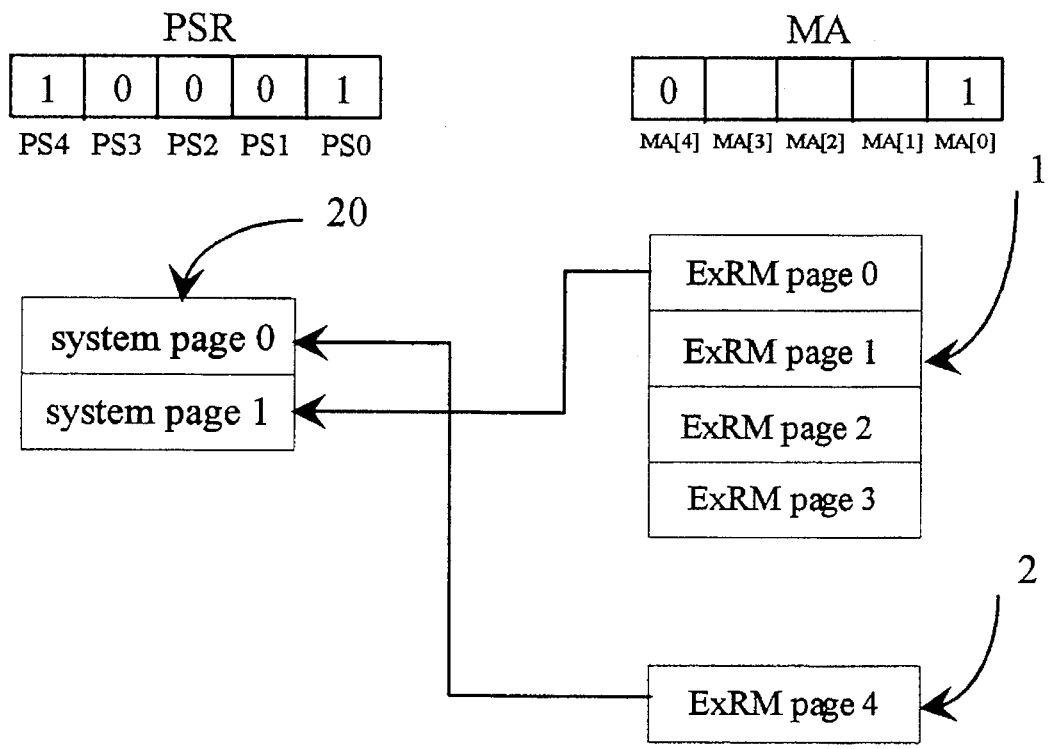

FIGS. 6B and 6C show two of the possible page configurations. Other page configurations can be easily derived.

The present invention utilizes a convert-read-to-write technique to "write" data into the PSR and MA. This step is necessary because conventional ROM interfaces do not allow write command. In the convert-read-to-write technique, a predetermined number of special addresses are reserved to include the data input to be written to the PSR and MA. When these special addresses are read, data will be written into the storage element corresponding thereto. A wide variety of options can be provided to implement the convert-read-to-write technique. An appropriate implementation of the convert-read-to-write technique is determined generally as a compromise between the number of addresses that need to be reserved for each method and the complexity of the circuitry that will be involved. FIGS. 7 through 11 illustrate several examples of the various convert-read-to-write methods that may be used to carry out the write procedure discussed in the present invention. Each of these methods is illustrated below.

Direct Convert-Read-To-Write Method

Figure 7:
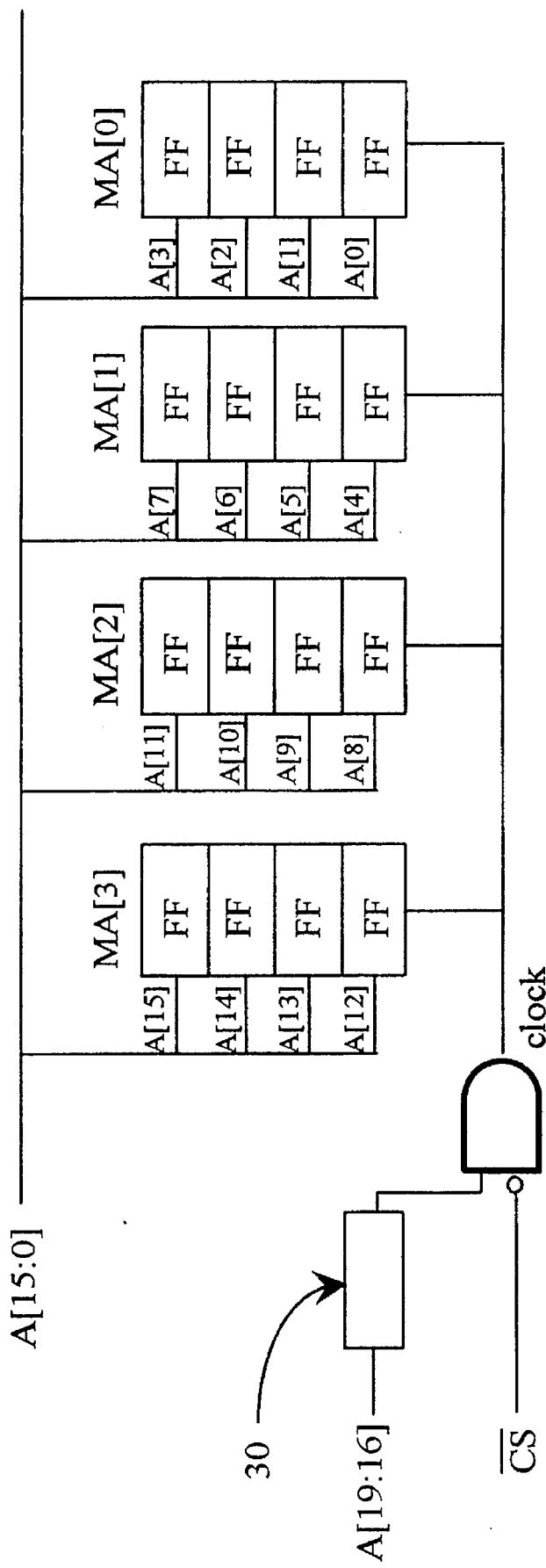
FIG. 7 a schematic diagram of a direct convert-read-to-write method.

FIG. 7 is a schematic diagram of a direct convert-read-to-write method, by which data to be stored in MA can be achieved by reading these addresses in a single step. This method is the easiest. In FIG. 7, the ExRM has 4 entries (4 total pages) in MA, each MA is a 4-bit array, and there are 20 address lines at the ROM interface are A[19:0]. With the direct input method, if we want to write the values of A into MA[0], B into MA[1], C into MA[2], and D into MA[3], we only need to read the addresses corresponding to those reserved for A, B, C, and D, i.e., 'hF{A, B, C, D } (A, B, C, and D are all 4-bit in the present situation). The disadvantage of the direct input method is that it may require an excessive number of reserved addresses thus making it impracticable. With the system described in FIG. 7, a total of 64K ($2^{16}$) addresses must be reserved. The highest four bits A[19:16] are compared in a comparator 30 with a pre-determined set of bits (preferably b1111) to trigger the convert-read-to-write procedure.

Direct Segmented Convert-Read-To-Write Method

Figure 8:
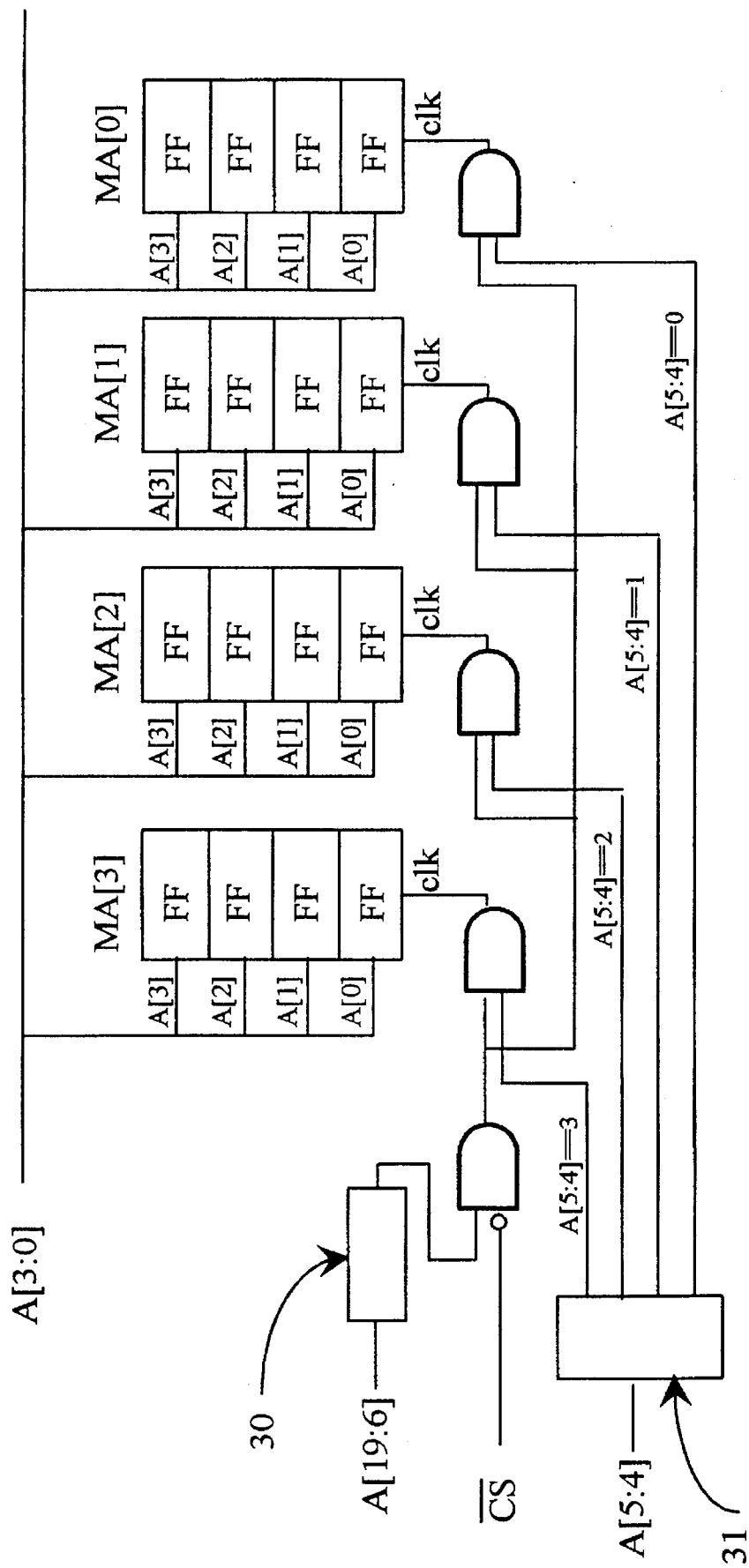
FIG. 8 is a schematic diagram of a direct segmented convert-read-to-write method.

FIG. 8 is a schematic diagram of a direct segmented convert-read-to-write method, by which data to be stored in MA can be achieved by reading the selected addresses in a plurality of segmented but direct steps. Using the same ExRM system as discussed in FIG. 7, the addresses of A, B, C, and D to be stored into MA are read separately at addresses of 'hFFF{1100}A, 'hFFF{1101}B, 'hFFF{1110}B, and 'hFFF{1111}D, respectively. With this method, the number of reserved addresses is reduced to $2^2 \times 2^4 = 2^6 = 64$, compared to the number of $2^{16}$ or 64K required in the direct method. The direct segmented convert-read-to-write method provides a most practical compromise in consideration of the complexity of the circuitry involved together with the number of addresses that need to be reserved. However, because it is segmented, the selected addresses must be read more than once, in the example shown in FIG. 8, four reading steps are required. In FIG. 8, it is shown that the highest 14 bits are used to trigger the convert-read-to-write operation (A[19:6] =b11111111111111). The lowest six bits, A[3:0] and A[5:4] are used, separately, for paging; a 2–4 decoder 31 is indicated in FIG. 8.

Indirect Segmented Convert-Read-To-Write Method

Figure 9:
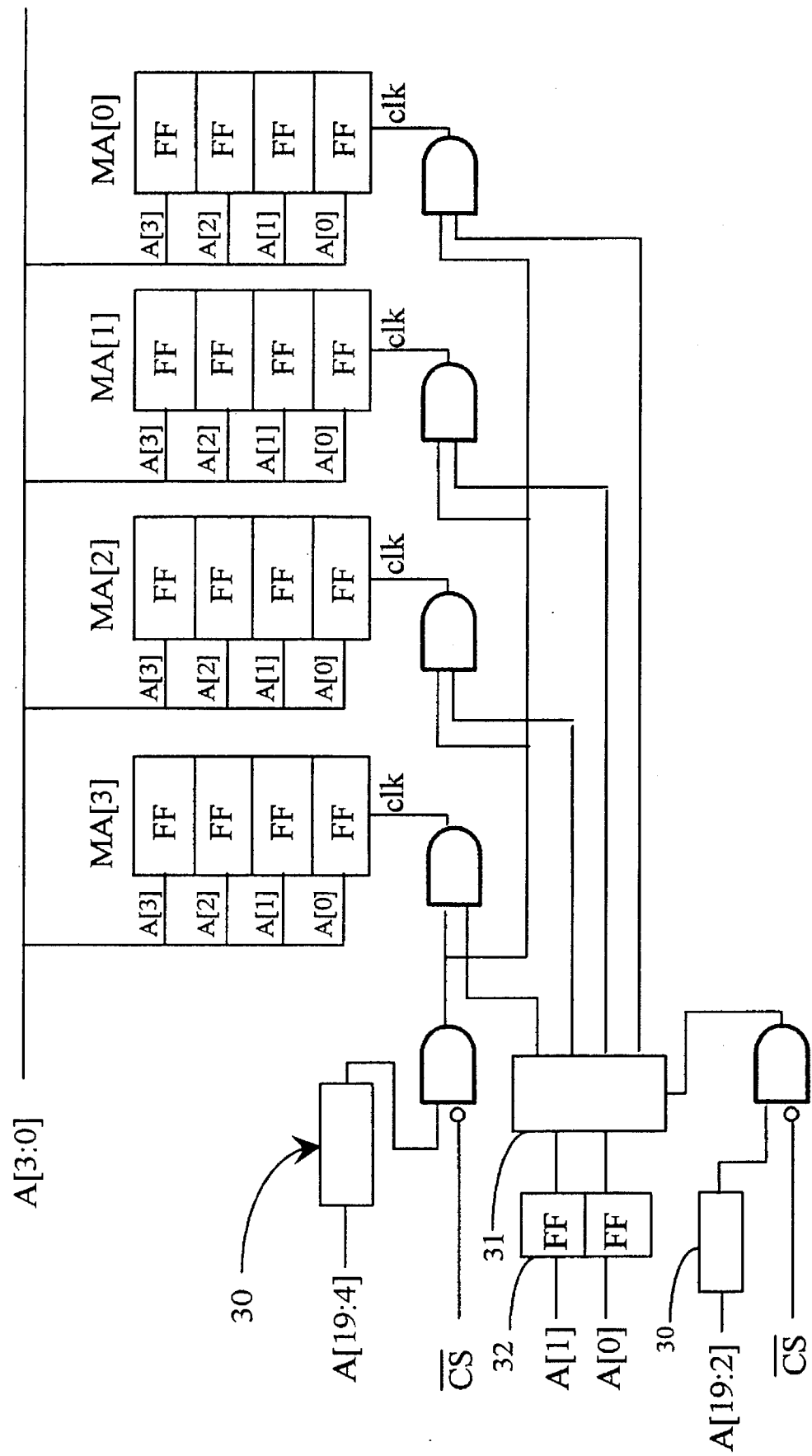
FIG. 9 is a schematic diagram of an indirect convert-read-to-write method.

FIG. 9 is a schematic diagram of an indirect segmented convert-read-to-write method, by which data to be stored in MA are achieved by reading the selected addresses in a plurality of segmented indirect steps. In this method, selected addresses are first written into an index register (IR) 32 using the convert-read-to-write technique. IR is also a temporary storage device, and it can be provided in the form of a latch or flip-flop, or any equivalent device. This step is followed by an address decoding step using a 2-to-4 address decoder, with its outputs written to the mapping arrays. The indirect segmented convert-read-to-write method further reduces the number of reserved addresses to $2^2 + 2^4 = 4 + 16 = 20$. The savings in the reserved addresses with the indirect segmented method relative to the direct method is greater with a higher number of total pages. For example, with a 16-page system (16 entries in the mapping array, each array being the same 4-bit array), the difference between the indirect segmented method and the direct segmented method is illustrated below:

Direct segmented method: $2^4 \times 2^4 = 256$

Indirect segmented method: $2^4 + 2^4 = 32$

With the direct and unsegmented method, the number of reserved addresses would have been an impossible $2^{64}$. This should illustrate the advantage of having segmented approach. The indirect segmented, although it substantially reduces the number of reserved addresses, involves a more complicated circuitry and a more complicated procedure for writing addresses to the storage elements in the mapping array. First, addresses must be written to IR using the convert-read-to-write technique. Then the decoded outputs are written to the mapping array. For example, in order to write xxxx to MA [yy] we must:

First: read address 'hFFFF{11yy}

Then: read address 'hFFFF {xxxx }

Because there are 4 entries in the mapping array, a total of 8 readings will be required.

Multiple Indirect Segmented Convert-Read-To-Write Method

Figure 10:
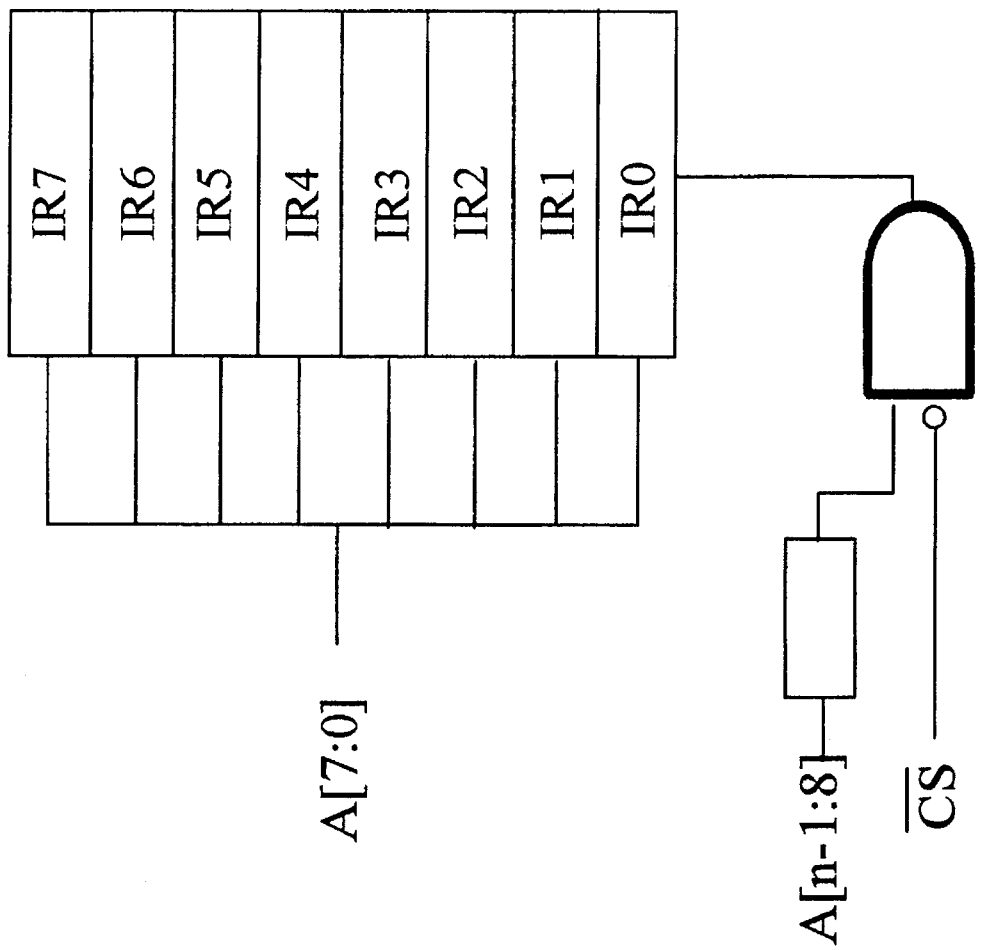
FIG. 10 is another schematic diagram of an indirect segmented convert-read-to-write method involving a large number of pages.

Even with an indirect segmented method, if the number of pages of an ExRM is large, a large number of bits will be correspondingly required, resulting in still large number of addresses that need to be reserved. For example, with an ExRM having 256 pages as shown in FIG. 10, an IR of 8 bits will be required using the indirect segmented method discussed above. This will require 256 reserved addresses.

Figure 11:
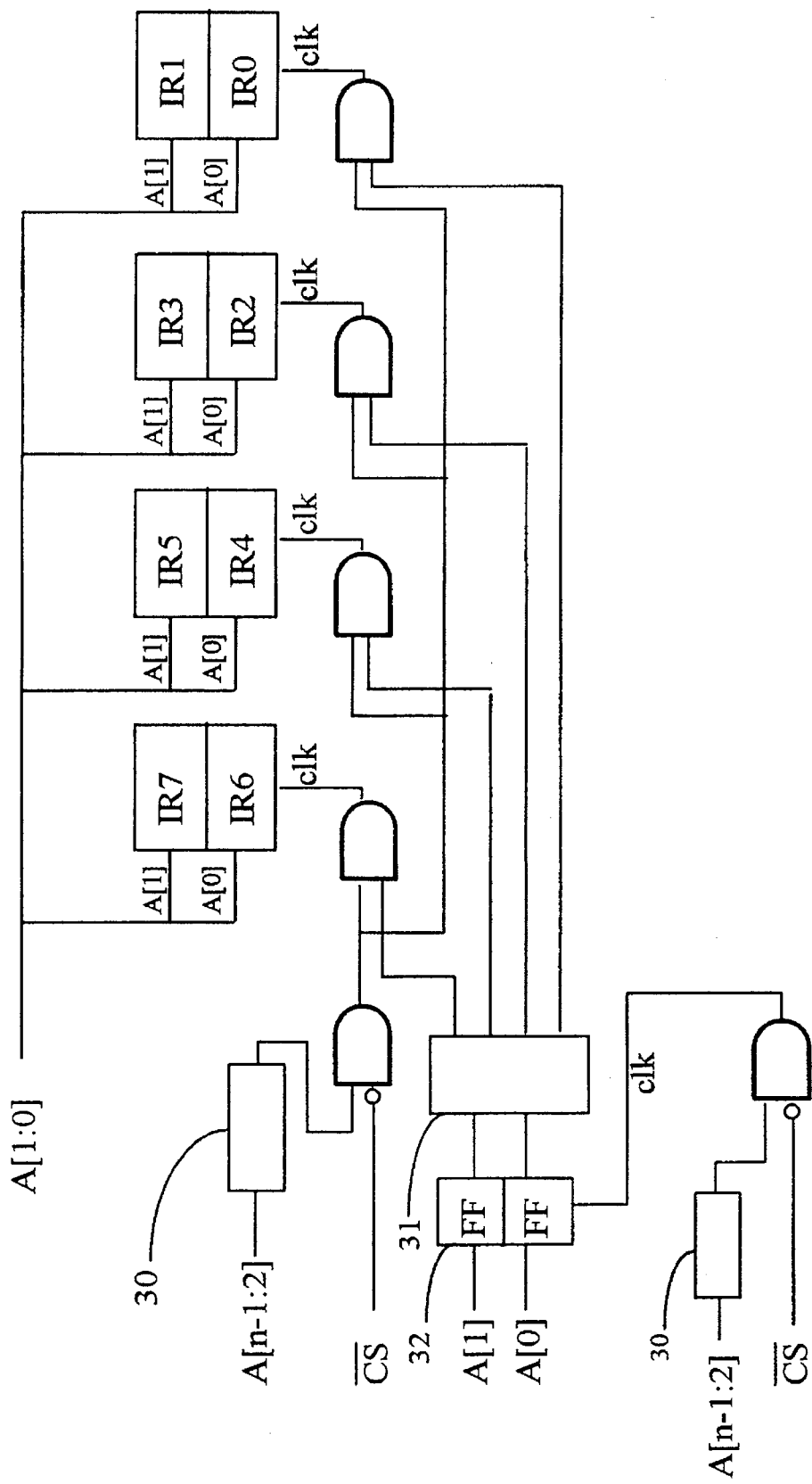
FIG. 11 is a schematic diagram of a multiple indirect segmented convert-read-to-write method involving a large number of pages.

The reserved addresses for ExRMs with large number of pages can be further reduced using a multiple indirect segment convert-read-to-write method, a schematic diagram of which is shown in FIG. 11. In the indirect segment convert-read-to-write method, the step of reading and thus writing addresses into the index register is further segmented into two or more steps. As shown in FIG. 11, the address signals are first fed into a secondary index register (IR2nd), decoded by a 2-to-4 decoder, and the outputs are fed to another index register (which will be the primary index register) in the configuration as shown in FIG. 11. With the multiple segmented indirect method, the number of reserved addresses is reduced to $2^2+2^2=8$, from the 256 addresses using the single indirect method. However, the address signals must be first written to IR2nd then to IR. Eight readings will be required for each index register for the system shown in FIG. 11. Since there are 256 entries in the mapping array, a total number of 8×256=2048 convert-read-to-write steps will be required.

The present invention will now be described more specifically with reference to the following example. It is to be noted that the following descriptions of example including preferred embodiment of this invention are presented herein for purpose of illustration and description; it is not intended to be exhaustive or to limit the invention to the precise form disclosed.

An ExRM is designed comprising a Model 27256 (32K× 8) ROM interface and 2 Model 27010 (128K×8) ROM chips. The system parameters for the ExRM are calculated below:

I=$\log_2$ 32K=15 n=2

$R_0$=$\log_2$ 128K=17

$R_1$=$\log_2$ 128K=17

The page parameters are then calculated below:

P=15; S=1; and T=8

Figure 12:
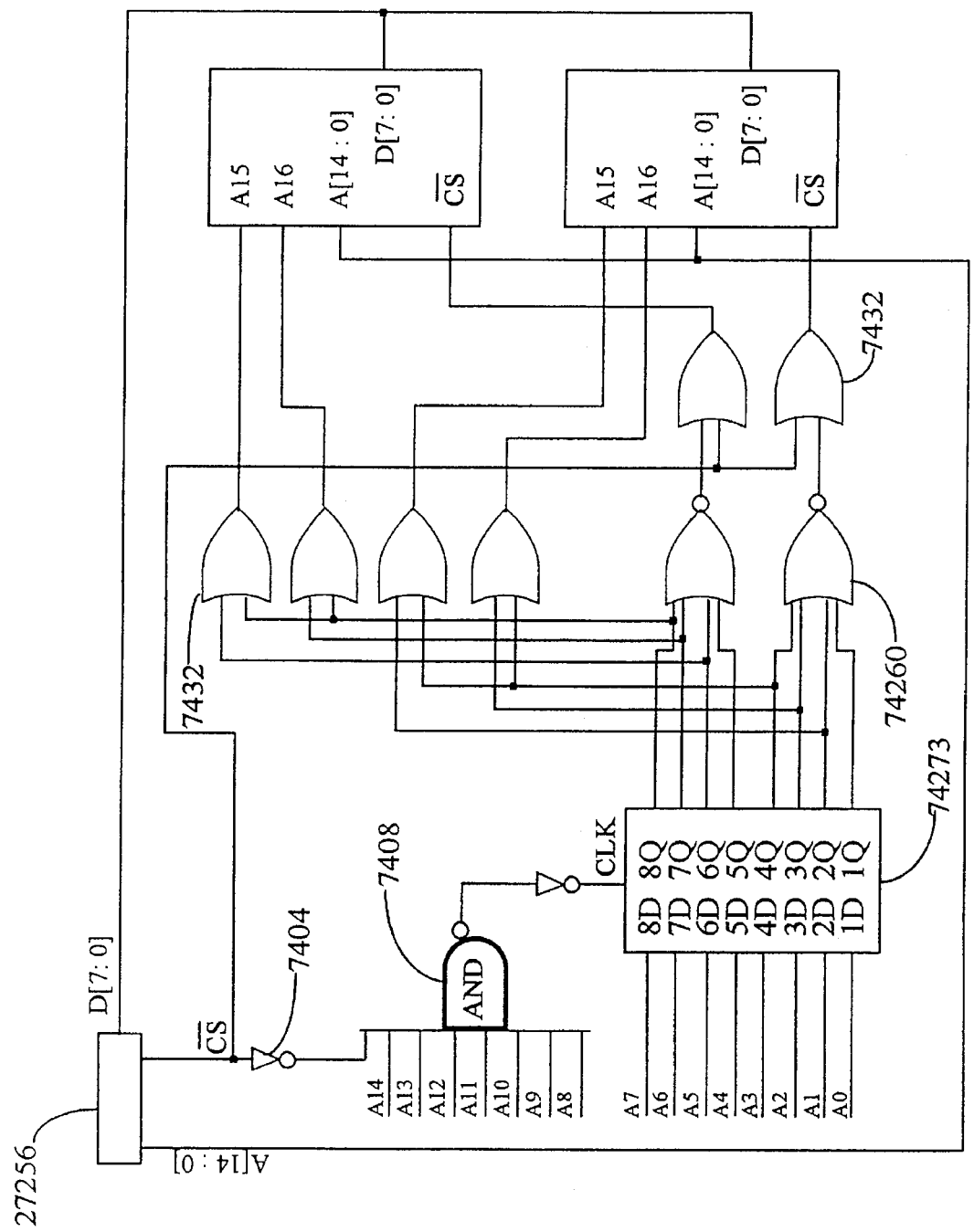
FIG. 12 is a schematic diagram of a preferred embodiment of the ExRM disclosed in the present invention.

Since the total number of pages in this Example is 8, the PSR is an 8-bit register. Further, since I–P=0, the entry for the mapping array is 0-bit; therefore, no mapping array need be allocated. For simplicity, a direct convert-read-to-write method is used to design the PSR. FIG. 12 shows a schematic diagram of the ExRM of this example. The ExRM, as shown in FIG. 12, is shown to use two 27010 ROM chips, ROM_0 and ROM_1, each having a capacity of 256K×8, on a ROM interface that was originally designed for 27256 (32K×8). Because the EPROMs are plug-compatible, the socket which accepts the 27256 chip can also accept other EPROMs of larger capacity, such as 27512 (64K×8), or 27010 (128K×8). Therefore, if one 27010 and one 27512 are used, the ExRM will have a capacity of 192K×8, and there will be a total of 6 pages. If, on the other hand, two 27256 chips are used in making the ExRM, then the total capacity will be 64K×8 with only two pages. The smallest capacity ExRM in this example can consist of only one 27256, in such case, the capacity can be described as "unexpanded". Therefore, with various combinations of 27256, 27512 and 27010, we can design ExRMs using the same ROM interface and having expandable capacities from 32K×8 to 256K×8, with an increment of 32K×8.

As shown in FIG. 12, higher bit address lines A[8:14] and an inverted chip select control line were fed to an NAND gate (7430, or a combination of 7408s). The output from the NAND gate was inverted by an inverter 7404 and then fed to a latch 74273, which also receives inputs from the lower bit address lines A[0:7]. Upon proper identification, e.g., when A[8], A[9], . . . , A[14]=1 and $\overline{CS}$=0, the clock in the latch would be triggered, thus latching the page address inputs A[0] through A[7]. The latched values of A[0] through A[3] (and ground) determine the chip select signal CS0 through an NOR gate 74260; whereas, chip select signal $\overline{CS1}$ is determined by the latched values of A[4] through A[7] (also and ground). ROM_0 would be deselected (i.e., $\overline{CS0}$=0) when A[0] through A[3] were set to zero. Likewise, ROM_1 would be deselected (i.e., $\overline{CS1}$=0) when A[4] through A[7] were set to zero. Two additional address lines, A15 and A16, are required in 27010 to provide page information. Address inputs for page data were provided also with the lower bit address inputs. As shown in FIG. 12, the latched address inputs A[1] and A[3] determine, via an OR gate, the bit value of A0[15] in ROM_0; whereas, the latched address inputs A[2] and A[3] determine, also via an OR gate, the bit value of A0[16] in ROM_0. The bit values of A1 [15] and A0[16] in ROM_1 are determined from the latched address inputs A[5] and A[7], and A[6] and A[7], respectively and correspondingly.

The circuitry shown in FIG. 12 faciliates easy programing. For example, to latch address inputs to page 0, one simply has to send an address input with A[0]=1 and A[1], . . . , A[7]=0. The correspondence between page selection and address inputs for the ExRM shown in FIG. 12 are shown below:

| Address Input | Page Selection | $\overline{CS0}$ | $\overline{CS1}$ |
| --- | --- | --- | --- |
| 1 1 1 1 1 1 1 0 0 0 0 0 0 0 1 | Page0 | 0 | 1 |
| 1 1 1 1 1 1 1 0 0 0 0 0 0 1 0 | Page1 | 0 | 1 |
| 1 1 1 1 1 1 1 0 0 0 0 0 1 0 0 | Page2 | 0 | 1 |
| 1 1 1 1 1 1 1 0 0 0 0 1 0 0 0 | Page3 | 0 | 1 |
| 1 1 1 1 1 1 1 0 0 0 1 0 0 0 0 | Page4 | 1 | 0 |
| 1 1 1 1 1 1 1 0 0 1 0 0 0 0 0 | Page5 | 1 | 0 |
| 1 1 1 1 1 1 1 0 1 0 0 0 0 0 0 | Page6 | 1 | 0 |
| 1 1 1 1 1 1 1 1 0 0 0 0 0 0 0 | Page7 | 1 | 0 |

The 1s in the higher bits trigger the latch clock to store the page address. Other designs of course can be used. Once the page information is stored using the convert-read-to-write method, it stays in the system until the clock in the latch is triggered again by the entering of an appropriate page address input.

Figure 13A:
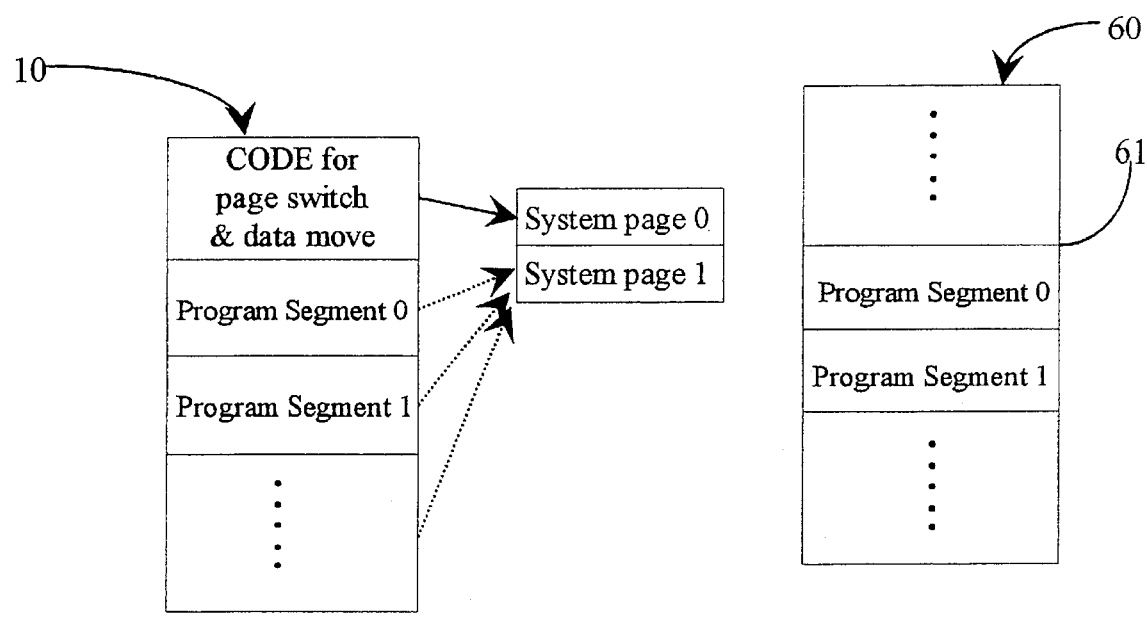
FIGS. 13A and 13B show schematic diagrams of first and second approaches, respectively, by with this ExRM-to-DRAM program can be executed.
Figure 13B:
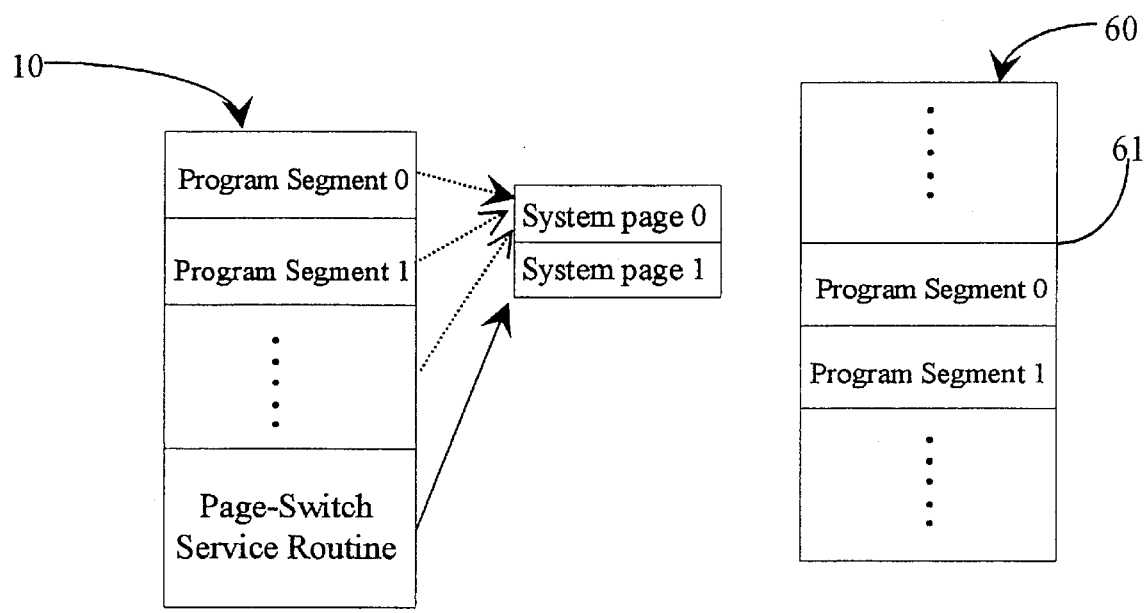

One of the difficulties in executing program codes stored in the ExRM is performing page-switching. This can be handled in one of at least two approaches. In the first approach, the program codes stored in ExRM are read and written as data to a dynamic random access memory (DRAM), in which the program will be executed. FIGS. 13A and 13B show schematic diagrams of first and second approaches, respectively, by with this ExRM-to-DRAM program can be executed. The ExRMs are indicated as numeral 10, and the DRAMs as indicated as numeral 60, with numeral 61 indicating the program starting point. In FIGS. 13A and 13B, the solid arrow indicates fixed mapping, and the dotted arrow indicates switchable mapping. The first approach requires DRAM resources and will not be applicable if there is not enough DRAM resource. The second approach is to define a fixed mapping between a predetermined ExRM page and a predetermined system page. The predetermined ExRM page will contain a page-switch service routine to provide routines corresponding to appropriate addresses that will carry out instructions regarding address switching. For example, an ExRM_call(address) can be provided corresponding to "call address", and ExRM_jump (address) to "jmp address", etc. In preprogramming the ExRM, the commonly used command names must be appropriately replaced with their corresponding routines, for example:

jmp B→call ExRM_jmp (B)
call B→call ExRM_call (B)

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. An expandable ROM module comprising:
   (a) a ROM interface having a predetermined number of address lines;
   (b) a memory array of variable size, said memory array can be divided into T pages of equal-sized subarrays, wherein T is a positive integer;
   (c) a temporary storage means for storing page information, which will be used to direct address inputs from said address lines to a predetermined page of said memory array, said temporary, storage means comprising T mapping arrays;
   (d) a convert-read-to-write means for writing said page information to said temporary storage means; and
   (e) a selection circuit connected to said ROM interface for decoding an input address data into said page information, said selection circuit containing a comparator to compare a first portion of said input address data against a predetermined string of bits, and when said predetermined string of bits is detected at predetermined locations in said input address data, said selection circuit will trigger said convert-read-to-write means and cause a second portion of said input address data to be stored in said temporary storage means as said page information;
   (f) wherein said convert-read-write means is selected from the group consisting of direct segmented convert-read-to-write means, indirect segmented convert-read-to-write means, and multiple indirect segmented convert-read-to-write means;
   (g) further wherein with said direct segmented convert-read-to-write means, page addresses to said T mapping arrays are written in a plurality of steps; with said indirect segmented convert-read-to-write means, page addresses to said T mapping arrays are first written to an index register and then decoded before being written to said T mapping arrays; and with said multiple indirect segmented convert-read-to-write means, page addresses to said T mapping arrays are first written to a first index register, decoded, then written to at least one more index register and decoded again before being written to said T mapping arrays.

2. The expandable ROM module according to claim 1, wherein said ROM interface being incapable of receiving and implementing a write-enable control signal.

3. The expandable ROM module according to claim 1, wherein said memory array comprises a plurality of ROM chips each having a predetermined capacity.

4. The expandable ROM module according to claim 3, wherein at least two of said ROM chips have different capacities.

5. The expandable ROM module according to claim 3, wherein said ROM interface has I number of address lines, I being a positive integer, and said page has a page size equaling the smallest of the capacities of said ROM chips or $2^I$, if $2^I$ is smaller than any of the capacity of said ROMs.

6. The expandable ROM module according to claim 5, wherein said page size equals $2^P$ and P is less than or equal to I.

7. The expandable ROM module according to claim 6, wherein said temporary storage means comprises a T-bit page selection register and T mapping arrays, each of said mapping arrays having (I–P) entries.

8. The expandable ROM module according to claim 7, wherein I is greater than P and said convert-read-to-write means is a direct segmented convert-read-to-write means by which page addresses to said T mapping arrays are written in a plurality of steps.

9. The expandable ROM module according to claim 7, wherein I is greater than P and said convert-read-to-write means is an indirect segmented convert-read-to-write means by which page addresses to said T mapping arrays are first written to an index register and then decoded before being written to said T mapping arrays.

10. The expandable ROM module according to claim 7, wherein I is greater than P and said convert-read-to-write means is a multiple indirect segmented convert-read-to-write means by which page addresses to said T mapping arrays are first written to a first index register, decoded, then written to at least one more index register and decoded again before being written to said T mapping arrays.

11. The expandable ROM module according to claim 1, wherein said temporary storage means comprises a latch or a flip-flop.

12. The expandable ROM module according to claim 1, wherein said convert-read-to-write means containing means for storing a chip select signal in said temporary storage means.

13. A method to expand memory capacity of a read-only-memory (ROM) which has a predetermined number of address lines and does not accept write signals, said method comprising the steps of:
   (a) providing a temporary storage means comprising T mapping arrays;
   (b) expanding the memory capacity of said ROM by adding one or more new ROMs or by expanding the memory capacity of the existing ROM to provide an expanded ROM having an expanded memory capacity;
   (c) dividing said expanded memory capacity into T pages;
   (d) assigning a page address code to each page;
   (e) obtaining a page addressing means for sending page address inputs to said temporary storage means and store a page information therein, said page addressing means comprising a convert-to-read means, which is selected from the group consisting of direct segmented convert-read-to-write means, indirect segmented convert-read-to-write means, and multiple indirect segmented convert-read-to-write means, and a selection circuit for decoding an input address data into said page information, said selection circuit containing a comparator to compare a portion of an input address data against a predetermined string of bits at predetermined bit locations, and when said predetermined string of bits is detected in an input address data, said selection circuit will trigger said temporary storage means and store another portion of said input address data in said temporary storage means as said page information; and (f) when data from a predetermined page of said expanded memory is to be read, sending an input address data, one portion thereof contains said predetermined string of bits at said predetermined bit locations and another portion contains said page information corresponding to said predetermined page, whereby, upon detection of said predetermined string of bits at said predetermined bit locations by said comparator, said page addressing means will trigger said temporary storage means and store said paging information in said temporary storage means so as to direct subsequent read instructions into said predetermined page, until a new page information is received by said page addressing means;

(g) further wherein with said direct segmented convert-read-to-write means, page addresses to said T mapping arrays are written in a plurality of steps; with said indirect segmented convert-read-to-write means, page addresses to said T mapping arrays are first written to an index register and then decoded before being written to said T mapping arrays; and with said multiple indirect segmented convert-read-to-write means, page addresses to said T mapping arrays are first written to a first index register, decoded, then written to at least one more index register and decoded again before being written to said T mapping arrays.

14. The method to expand memory capacity of a read-only-memory according to claim 13 wherein said expanded ROM containing at least two ROM chips of different memory capacity.

15. The method to expand memory capacity of a read-only-memory according to claim 13 which has I address lines and a total of T pages, each page having a page size of $2^P$, wherein said temporary storage means comprising a page selection register and a mapping array, said page selection register being a T-bit register and said mapping array having T entries, one entry for each page and each entry having (T–P) bits.

16. The method to expand memory capacity of a read-only-memory according to claim 15 wherein I is greater than P and said convert-to-read means is a direct segmented convert-read-to-write means by which a selected page configuration in a plurality of steps.

17. The method to expand memory capacity of a read-only-memory according to claim 15 wherein I is greater than P and said said convert-to-read means is an indirect segmented convert-read-to-write means which comprises the following steps:

(a) providing an index register connected to said mapping array having T entries;

(b) sending an address code corresponding to a selected page configuration to said index register connected to said mapping array having T entries and decoding said page configuration; and (c) sending said decoded page configuration to said mapping array having T entries.

18. The method to expand memory capacity of a read-only-memory according to claim 15 wherein I is greater than P and said convert-to-read means is a multiple indirect segmented convert-read-to-write means which comprises the following steps:

(a) providing a plurality of index registers connected in series and finally to said mapping array having T entries;

(b) sending an address code corresponding to a selected page configuration to said plurality of index registers and decoding said address code after each index register; and (c) sending said decoded page configuration to said mapping array having T entries.

* * * * *